US007388579B2

(12) United States Patent
O'Gorman et al.

(10) Patent No.: US 7,388,579 B2
(45) Date of Patent: Jun. 17, 2008

(54) REDUCED POWER CONSUMPTION FOR A GRAPHICS ACCELERATOR AND DISPLAY

(75) Inventors: Patrick O'Gorman, Grayslake, IL (US); Ken Foo, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 654 days.

(21) Appl. No.: 10/427,784

(22) Filed: May 1, 2003

(65) Prior Publication Data

US 2004/0217954 A1 Nov. 4, 2004

(51) Int. Cl.
*G09G 3/36* (2006.01)
*G09G 5/00* (2006.01)
*G06F 3/038* (2006.01)

(52) U.S. Cl. .......................... 345/211; 345/98; 345/204

(58) Field of Classification Search ................ 345/204, 345/211–213, 533, 534, 98
See application file for complete search history.

(56) References Cited

U.S. PATENT DOCUMENTS 5,502,837 A * 3/1996 Hoffert ....................... 713/400
5,524,249 A * 6/1996 Suboh ........................ 713/322
5,796,391 A * 8/1998 Chiu et al. .................. 345/204
5,867,140 A 2/1999 Rader
6,320,564 B1 * 11/2001 Kasai et al. .................. 345/87
6,429,840 B1 * 8/2002 Sekiguchi .................... 345/88
6,476,800 B2 * 11/2002 Millman et al. ............ 345/212
6,734,866 B1 * 5/2004 Dotson ....................... 345/546
2002/0111200 A1 * 8/2002 Nikawa et al. ............. 455/574
2002/0190941 A1 * 12/2002 Naiki .......................... 345/94

* cited by examiner

*Primary Examiner*—Bipin Shalwala
*Assistant Examiner*—Steven E Holton
(74) *Attorney, Agent, or Firm*—Hisashi D. Watanabe

(57) ABSTRACT

The preferred embodiments of the present invention provide a system and method for reducing the battery power required by a handheld device (300) that incorporates a graphical display (301). Graphical display (301), display drivers (307), LCD controller (403) and a memory (405) are optimized such that several pixels of information may be clocked simultaneously when the device is operating in a partial display mode. The optimized circuitry reduces the required refresh clock frequency (411) and thus the current drain on a device battery (319) thereby improving device operation time.

6 Claims, 4 Drawing Sheets

REDUCED POWER CONSUMPTION FOR A GRAPHICS ACCELERATOR AND DISPLAY

FIELD OF THE INVENTION

The present invention relates generally to graphical displays, and more particularly, to an apparatus and method for reducing the power consumption of a graphics accelerator.

BACKGROUND OF THE INVENTION

Many handheld devices, such as personal digital assistants (PDAs), wireless telephones, cellular telephones, and laptop computers, incorporate graphical displays. Because these devices operate on battery power, they are constrained to a limited time of operation based on battery drain. Some device displays may cause a drain on the battery even when the device is not fully in use. For example, the typical handheld device has a means of indicating a status, such as whether the device is on or off. Additionally, the display may provide an indication of received radio signal strength from a network, and battery charge status. Recent models of mobile telephones employ graphical displays that incorporate all or more such indications as standard regardless of whether the phone is fully powered or in stand-by mode. Because the graphical display requires battery power to maintain standard indications, the battery charge time and thus operation time of the mobile device is inconveniently reduced.

Various techniques can be used to reduce battery drain due to a device display. One such technique is to define a partial display area, such that when user input is not present for some period of time, only a portion of the display receives power.

Another technique is to reduce the color depth of the displayed pixels. Normally, for a full graphical display, several bits are utilized to define each basic spectral color per pixel. However, when a device is in a stand-by mode, it is not necessary to provide a full-color depth. In stand-by mode, a reduced number of colors could be used such that fewer bits per basic spectral color are required. This reduced number of bits reduces battery drain by lowering the power required to refresh the display.

Although techniques such as partial display and reduced color depth help reduce battery drain by the display, other elements within a handheld device associated with the display also require battery power. For example, none of the techniques address the power consumed by graphic display buffers or other similar memory elements required to maintain the display in standby mode.

Therefore, a need exists for reducing the battery drain due to other elements of the display circuitry, when the device display is in a stand-by mode or partial display mode.

DETAILED DESCRIPTION OF THE PREFERRED EMBODIMENTS

Figure 1:
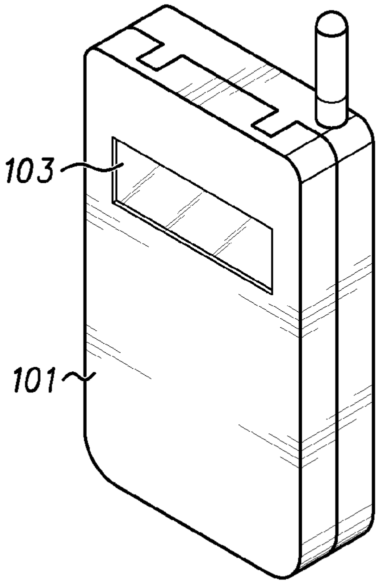
FIG. 1 is a diagram illustrating a typical handheld device.

An apparatus and method for power reduction of a display graphics accelerator are provided herein. In preferred embodiments of the present invention, a handheld device in stand-by mode switches to a partial graphical display mode. In partial graphical display mode, a display module and a memory element used in conjunction with the partial graphical display are optimized such that data lines are clocked simultaneously. Because data lines are clocked simultaneously, multiple pixels may be refreshed simultaneously. Thus, the refresh clock frequency is reduced during partial display mode, which results in reduction of battery drain and improved operation time.

A first aspect of the present invention is a circuit for reducing the power consumption of a graphical display comprising a memory component. The memory component has a full display mode corresponding to a first clock cycle and a partial display mode corresponding to a second clock cycle different from the first clock cycle. The memory component outputs a single pixel per clock cycle for the full display mode and outputs a plurality of pixels per clock cycle for the partial display mode.

A second aspect of the present invention is a display controller. The memory component has a bit width suitable for storing color bit information for a number of pixels within the bit width, and is capable of transferring the color bit information for the number of pixels in parallel. The display controller is capable of receiving the color bit information for the number of pixels in parallel from the memory component, and transmitting the color bit information in parallel.

A third aspect of the present invention is a display module comprising first and second signal inputs. The first signal input receives a partial mode signal. The second signal input receives color bit information for a plurality of pixels in parallel.

A fourth aspect of the present invention is a battery-powered device comprising a graphical display, a memory component and a display controller. The memory component has a bit width suitable for storing color bit information for a number of pixels within the bit width, and is capable of transferring the color bit information for the number of pixels in parallel. The display controller is capable of receiving the color bit information for the number of pixels in parallel from the memory component, and transmitting the color bit information in parallel.

A fifth aspect of the present invention is a method of implementing a partial display mode for a battery-powered device. The battery-powered device is switched into stand-by mode and a display is switched into partial display mode. Next, a reduced number of color representation bits per pixel are stored in a memory during partial display mode. A clock frequency is then reduced by a factor related to the number of pixels. Thereafter, pixel data is transmitted for the number of pixels in parallel from memory to a controller. Finally, the pixel data is transmitted in parallel from the controller to the display.

The present invention relates to an apparatus and method for reducing the power consumed by a graphics accelerator. For the preferred embodiments described herein, a handheld device having a display is switched into a stand-by mode based upon a detected level of user activity. The display, when in stand-by mode and therefore partial display mode, utilizes a clock frequency that is determined by the number of horizontal and vertical pixels in the display, and the required refresh rate.

The total number of pixels of a partial display ("partial display pixels") is determined by multiplying the number of vertical pixels in the partial display by the number of horizontal pixels in the partial display. For example, assuming that a total graphical display having 220 vertical pixels and 176 horizontal pixels uses only 32 rows in partial display mode, the total number of pixels of the partial display would be:

$$32\times176=5632 \text{ Partial Display Pixels}$$

The required refresh clock frequency for partial display mode is determined by multiplying the display refresh rate by the total number of partial display pixels. For example, assuming a display refresh rate of 15 Hz, the required refresh clock frequency would be:

$$15 \text{ Hz}\times5632 \text{ (Partial Display Pixels)}=84.48 \text{ kHz}$$

In preferred embodiments of the present invention, the display utilizes a reduced color depth per pixel during partial display mode. For example, an eight-color implementation requires 3 bits per pixel such that red, green and blue require 3 bit representation each. In a handheld device of preferred embodiments, an LCD controller is connected to an LCD driver via data and control lines, such as 18 data lines and 3 control lines. Each data line may be used to transmit one bit of color information from the LCD controller to the LCD driver. However, the clock refresh frequency may be reduced if several color information bits are clocked and thereby transmitted from memory to the LCD controller simultaneously. In preferred embodiments of the present invention, the memory block used by the LCD controller architecture has a width appropriate for storing bits, such as 18 bits. For the exemplary partial display provided herein, and using an eight-color depth, the total number of color data bits required to represent the partial display would be:

$$\text{(Number of Partial Display Pixels)}\times\text{(Number of color data bits per pixel).}$$

$$5632\times3=16896 \text{ bits}$$

Given a memory width of 18 bits, the number of rows required to accommodate the total bits required for the partial display is:

$$16986/18 \text{ columns}=939 \text{ rows}$$

Therefore, for this example, a memory block of 18×939 bits would be required to accommodate the exemplary partial display provided herein, in accordance with preferred embodiments of the present invention.

Because it is an object of the present invention to transfer color data bits to the LCD controller simultaneously, the clock refresh frequency for the partial display may thereby be reduced. Based again on the exemplary partial display provided herein, the refresh clock frequency of the partial display for transferring 6 color data pixels to the LCD controller would be: 84.48 kHz/6=14.08 kHz Because stand-by mode would require a lower refresh frequency for preferred embodiments of the present invention, a reduction in battery drain could be achieved improving the battery operation time of a handheld device.

Figure 2:
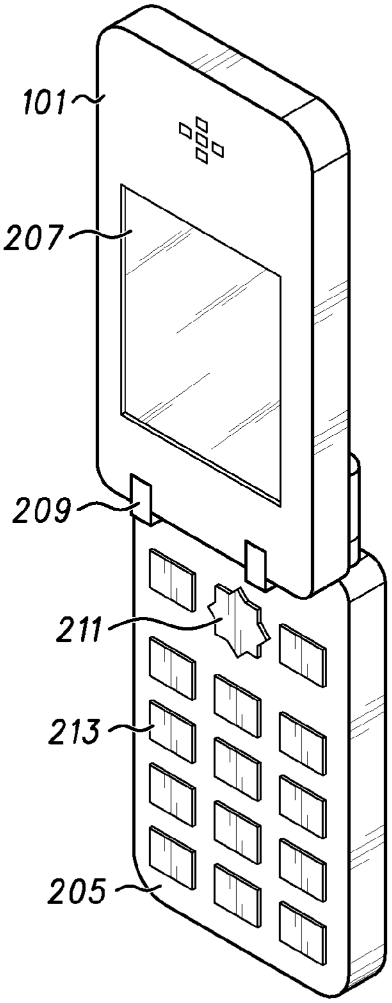
FIG. 2 is a diagram illustrating further details of the handheld device of FIG. 1.

Turning now to the drawings where like numerals designate like components, FIGS. 1 and 2 illustrate a handheld device in accordance with preferred embodiments of the present invention. The device may comprise a "clamshell" design in which cover 101 is connected to the main body 205 via a hinge connection 209. The cover 101 may further comprise dual displays, an external display 103 and an internal display 207. The internal display may be viewable by a user only when cover 101 is in an open position as illustrated in FIG. 2.

The handheld device may further comprise a keypad 213, and a joystick control 211, both of which facilitate user entry. The output displayed by the handheld device in response to a user entry, for example, may be displayed on internal display 207.

Standard indications such as time, date, and received network signal strength, may be shown on external display 103 when cover 101 is in the closed position as shown in FIG. 1. When the cover 101 is opened as shown in FIG. 2, the external display 103 may be disabled, and the standard indications may then be provided on internal display 207. Because internal display 207 is typically larger than external display 103, internal display 207 may show other indications not shown on external display 103 because of space limitations.

Other handheld device configurations may also be utilized in preferred embodiments of the present invention. For example, the main body 205 may incorporate a display. In this case, cover 101 would not have an external display but would have an aperture instead. The aperture would be sufficient to allow a user to view the display on the main body 205, when the cover 101 is in the closed position. Any standard indications would be shown on the display incorporated into the main body 205.

A third device configuration that may be utilized in preferred embodiments of the present invention is a "candy bar" design. In a device utilizing a "candy bar" design, the main body of the device does not have a cover and comprises a single display, keypad, and joystick control. The single display would normally provide standard indications to the user whenever the phone is powered on.

While any of the above-described device configurations are suitable for use of preferred embodiments of the present invention, the present invention is not limited to such devices. Because the object of the present invention is to reduce battery power consumed by the elements of a graphical display, any handheld device incorporating such a display would derive benefit from the incorporation of preferred embodiments.

Figure 3:
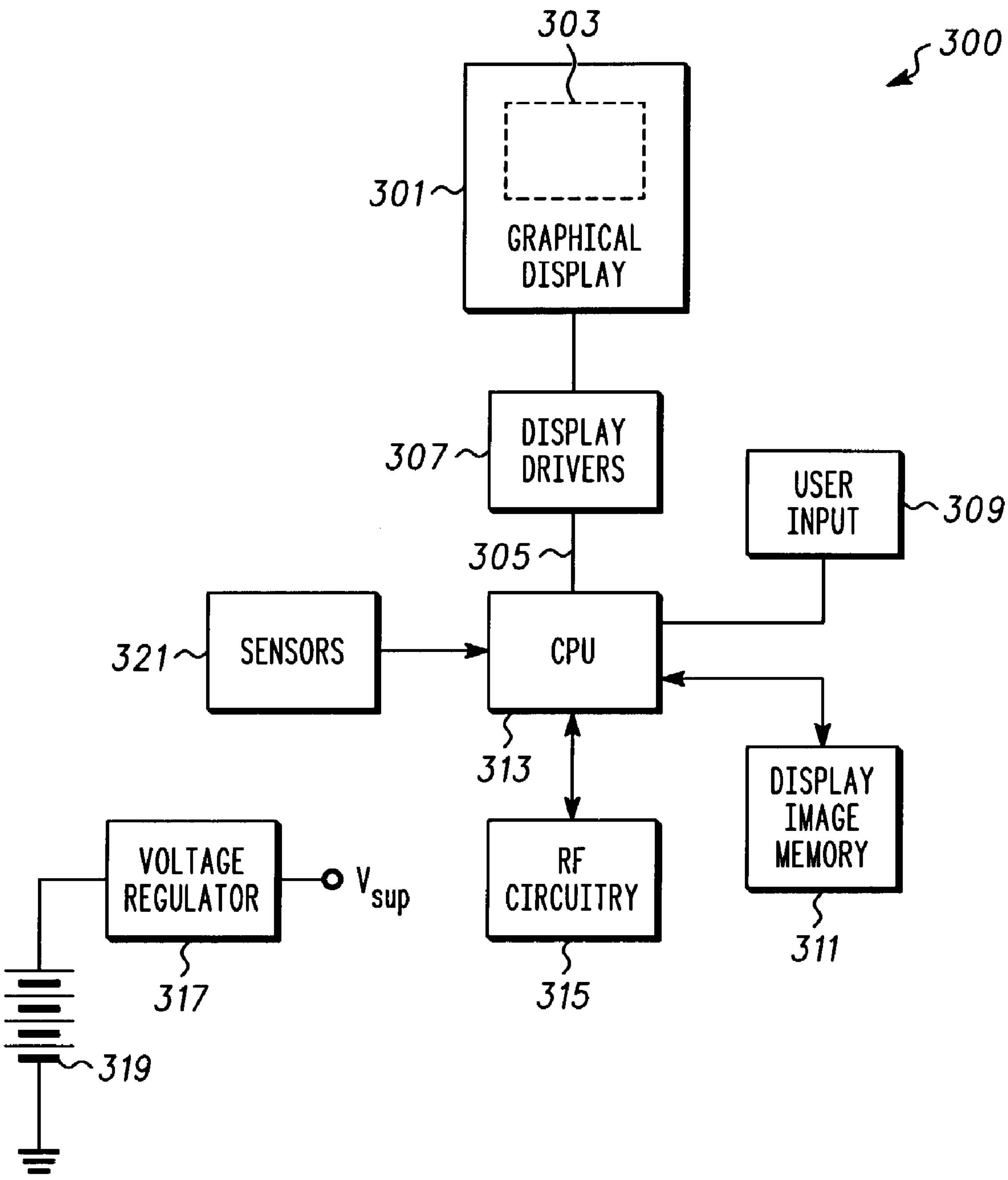
FIG. 3 is a block diagram illustrating components of the handheld device of FIG. 1.

FIG. 3 provides a block diagram illustrating components of a handheld device 300, in accordance with preferred embodiments. It should be noted that FIG. 3 is for illustrative purposes only and is applicable to any of the physical device configurations described above, such as the device illustrated by FIGS. 1 and 2. FIG. 3 illustrates the typical components of a handheld device. The handheld device 300 derives its power from a battery 319, which is connectively coupled to a voltage regulator 317.

Voltage regulator 317 is connectively coupled to a voltage supply bus, $V_{sup}$, which is further coupled to all circuit elements of the device 300. Device 300 further comprises means of user input 309, such as a keypad, and joystick control. Therefore, user input 309, as illustrated in FIG. 3, represents a plurality of user input mechanisms. User input 309 is connectively coupled to a central processing unit, CPU 313. CPU 313 may also be connected to a radio frequency (RF) circuitry 315, such that device 300 may receive signals from, and communicate with, a network (not shown).

Device 300 also incorporates sensors 321 to detect various states of the device. Sensors block 321 as illustrated in FIG. 3, represents a plurality of sensing mechanisms. For example, the circuitry of sensors 321 may incorporate a light detection means, such that the display brightness is adjusted based upon a detected level of light. Additionally, sensors 321 may incorporate an activity detection means to detect user activity with respect to user input 309. Another device state that may be detected by sensors 321 in preferred embodiments of the present invention is device position. For example, the sensors may detect when the device is horizontally positioned with respect to the ground, such as when the device is placed flat on the surface of a table or desk.

Any of the above-described states, or any other device state, as detected by sensors 321 and conveyed to CPU 313, may be used by CPU 313 to take a control action with respect to device 300.

In preferred embodiments of the present invention, a user's activity with respect to user input 309 may be detected and measured by sensors 321 and used, individually, in addition to, or in combination with other detected states, to control the state of the graphical display 301. Graphical display 301 is a liquid crystal display (LCD) and is comprised of a number of horizontal and vertical pixels. Graphical display 301 is also partitioned into a partial display 303 suitable for displaying standard indications of device 300 even when the remainder of display 301 is inactive. Graphical display 301 also requires display drivers 307 which are connectively coupled to graphical display 301, and in some preferred embodiments may be integrated with graphical display 301 so as to form a display module.

For either implementation of graphical display 301, the display drivers 307 are connectively coupled to CPU 313 via data and control lines 305. In preferred embodiments of the present invention, data and control lines 305 comprise 18 data lines and 3 control lines connectively coupling CPU 313 to display drivers 307.

Display image memory 311, is also connectively coupled to CPU 313 and is used to store pixel data of the graphical display 301 for purposes of rendering graphical images on graphical display 301. In some preferred embodiments, display image memory 311 is integrated with display drivers 307, such that display drivers 307 comprise drivers and display image memory 311.

Figure 4:
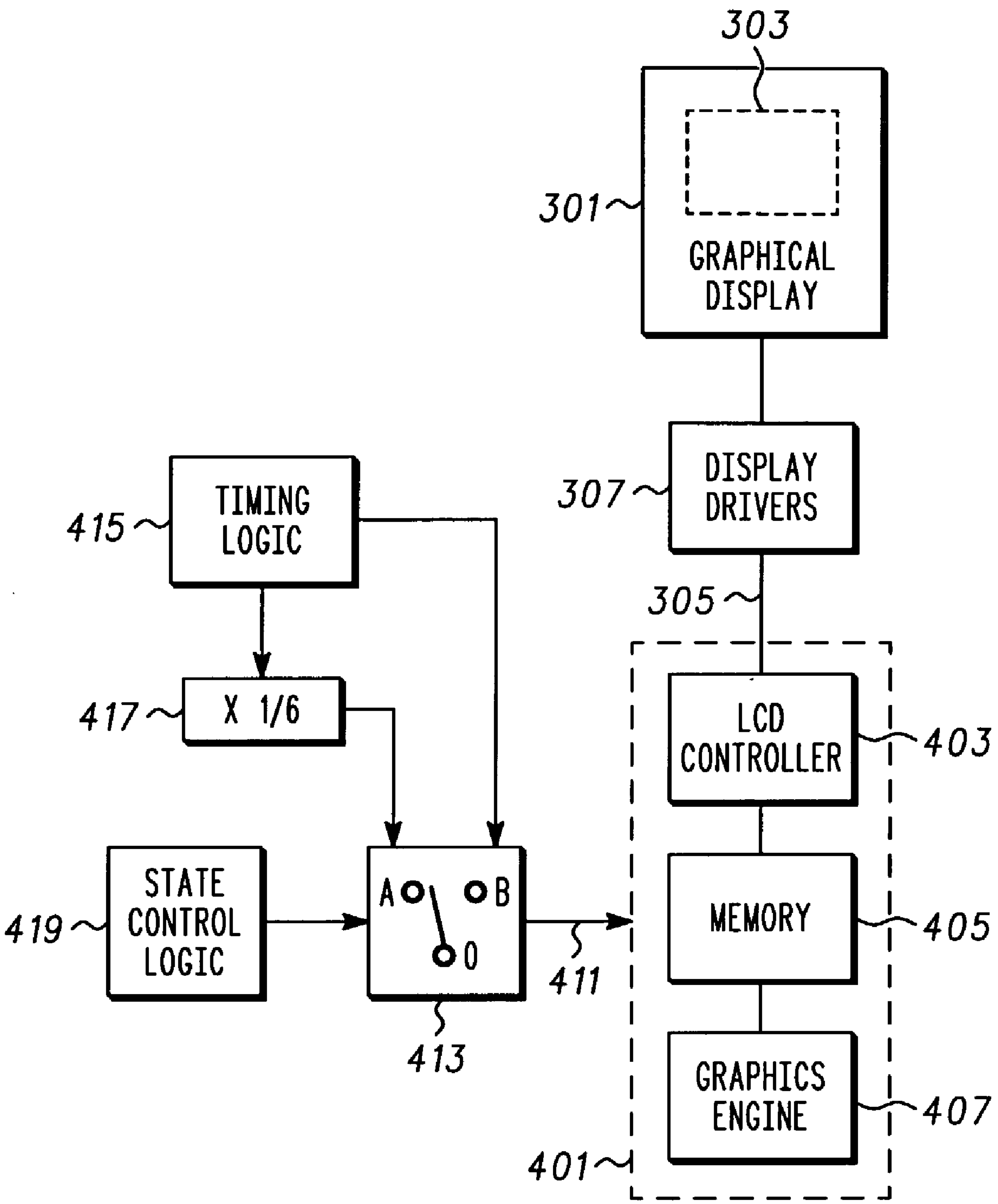
FIG. 4 is a block diagram in accordance with a preferred embodiment of the present invention.

FIG. 4 illustrates further details of the device 300 components in accordance with preferred embodiments of the present invention. In some preferred embodiments a graphics accelerator 401 is utilized to off load the main processor from the tasks required for rendering images on graphical display 301. The graphics accelerator comprises an LCD controller 403 which is connectively coupled to display drivers 307 via data and control lines 305. Further connected to the LCD controller 403 are memory 405 and graphics engine 407, which performs the processing tasks required for rendering images on graphical display 301. Graphical accelerator 401 receives a clock signal 411 via a timing logic 415.

Important to note is that memory 405 may have one of three different configurations for preferred embodiments of the present invention. In a first configuration, a small portion of the main memory of device 300 is dedicated for partial display mode. In a second configuration, device 300 incorporates a memory used exclusively for partial display mode operation. Lastly, various memory bit widths may be employed, as convenient for any of the above configurations.

Returning to FIG. 4, state control logic 419 is for illustrative purposes only and represents a control signal used by the main processor to determine the clock signal 411 frequency transmitted to graphics accelerator 401. For example, the sensors 321 transmit a state indication to CPU 313, which then implements state-control logic 419 to determine the position of clock-switch 413. It should be noted that clock-switch 413, as illustrated in FIG. 4, is only for purposes of showing the basic logical operation of device 300 and not to designate a specific implementation. Rather, implementation of state control logic 419 and clock-switch 413 represent any suitable implementation.

In normal operation of device 300, specifically when device 300 is not in a stand-by mode, clock-switch 413 is in position "B" such that timing logic 415 provides a clock signal 411 determined by the total number of horizontal and vertical display pixels of display 301, and a required refresh rate.

In preferred embodiments of the present invention, when state control logic 419 determines that device 300 should switch into a stand-by mode of operation, clock-switch 413 is switched to position "A" such that the clock signal generated by timing logic 415 is reduced by a factor by division block 417, such as a factor of six. It is to be noted that timing logic 415 and division block 417 are for purposes of illustrating logical operation only and are not a limitation on the implementation of such logic. Rather, the actual implementation of timing logic 415 and division block 417 may be done in any suitable manner.

Upon the device 300 switching to stand-by mode, the graphical display 301 is likewise switched into a partial display mode such that only partial display 303 is active.

In preferred embodiments of the present invention, when device 300 is switched into partial display mode, a reduced number of colors are utilized such that only a limited number of color representation bits per pixel are required. For example, in partial display mode, only 8 colors may be utilized such that only 3 color representation bits per pixel are required. Further, in preferred embodiments of the present invention, data and control lines 305 comprise an additional control line specifically such that LCD controller 403 may transmit a control signal to display drivers 307 to cause display drivers 307 to operate in a partial mode. The graphical display module, which comprises graphical display 301 and display drivers 307, is optimized in preferred embodiments, such that the data bits for partial display 303 pixels, such as six partial display pixels, may be received from LCD controller 403, in a parallel and therefore simultaneous manner.

Likewise, memory 405 is optimized in preferred embodiments to have a width such that the fractional clock signal 411 received by graphics accelerator 401 facilitates the transfer of a full width of bits to the graphical display module. In preferred embodiments, the full width of bits will contain information for a plurality of pixels. For example, for a width of 18 bits, a $\frac{1}{6}$ clock signal 411 may facilitate the transfer of 6 pixels of data to the graphical display module. Further for this example, because 8-colors are used in partial display mode, and therefore 3 bits are required per partial display 303 pixel, 18 bits represents 6 pixels of color information (3 bits per pixel×6 pixels=18 bits). Because the clock frequency of preferred embodiments is reduced by a factor, such as a factor of six, the current drain on battery 319 may be reduced thereby improving the device 300 time of operation in accordance with the object of the present invention.

As mentioned above, it is not required that the memory of the preferred embodiments be 18 bits in width. Smaller bit widths, such as for example 15 bits, may also be used in accordance with preferred embodiments of the present invention.

Figure 5:
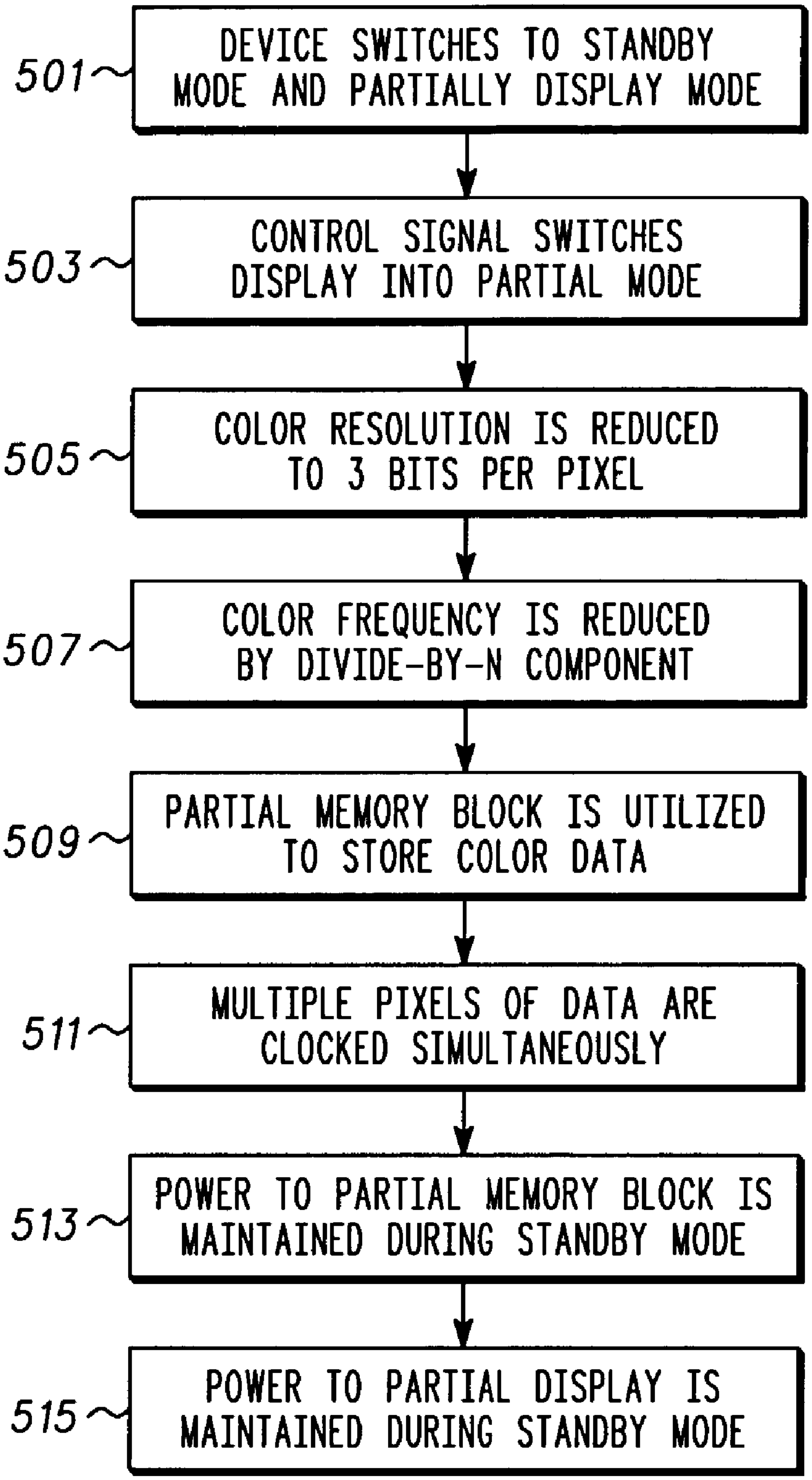
FIG. 5 is a flow diagram of device operation in accordance with a preferred embodiment of the present invention.

FIG. 5 is a block diagram illustrating basic operation in accordance with preferred embodiments of the present invention. In block 501, a handheld device switches into stand-by mode and thus into a partial display mode. In 503, a control signal is transmitted from an LCD controller to a display module or to display drivers to cause the display module or display drivers to operate in a partial display mode. In 505, operation of the display utilizes, for example, 8-colors and therefore requires 3 color data bits per pixel. In 507, the clock frequency required for partial mode is reduced in proportion to the number of bits being simultaneously clocked from memory to the display module or display drivers. Block 509 indicates the use of a special memory block for storage of partial display pixel data; either a configured portion of main memory, or a special memory dedicated to partial display mode. In 511, in accordance with operation of preferred embodiments of the present invention, multiple pixels are clocked simultaneously from the memory storage to the display. In 513 and 515, power is maintained to the partial display mode memory block, and to the partial display in accordance with preferred embodiments.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A circuit for reducing the power consumption of a graphical display comprising:

a memory component having a full display mode corresponding to a first clock cycle and a partial display mode corresponding to a second clock cycle less than the first clock cycle the memory component being configured to output a single pixel per clock cycle for the full display mode and output a plurality of pixels per clock cycle for the partial display mode.

2. A circuit for reducing the power consumption of a graphical display comprising:

a memory component having a bit width suitable for storing color bit information for a number of pixels within said bit width, and capable of transferring said color bit information for said number of pixels in parallel;

a display controller coupled to said memory component by a number of data lines, said display controller capable of receiving said color bit information over said data lines, for a single pixel in a full display mode and for said number of pixels in parallel in a partial display mode, from said memory component, and transmitting said color bit information in parallel; and a display module having a control line to receive a partial mode signal and receiving said color bit information for said number of pixels in parallel from said display controller, wherein the full display mode corresponds to a first clock cycle and the partial display mode corresponds to a second clock cycle less than the first clock cycle.

3. The circuit of claim 2, wherein said number of pixels is less than said number of data line connections between said display controller and said display module when said graphical display operates in said partial mode.

4. The circuit of claim 3 further comprising a timing logic capable of providing at least two clock frequency outputs to said memory component, said display controller, and said display module wherein a first of said at least two clock frequency outputs corresponds to said full display mode and wherein a second of said at least two clock frequency outputs corresponds to said partial display mode and is less than said first of said at least two clock frequency outputs and is proportional to said number of pixels in parallel in said partial display mode.

5. The circuit of claim 3, further comprising a timing logic capable of providing at least two clock frequency outputs to said memory component, said display controller, and said display module and wherein the second clock frequency is one-sixth of the first clock frequency, wherein said second clock frequency corresponds to said partial display mode.

6. The circuit of claim 2, further comprising:

display drivers, coupled to said display controller said display drivers being configurable for a full display mode and a partial display mode, wherein:

in said full display mode, said display drivers receive a single pixel of color bit information in parallel over said data lines; and in said partial display mode, said display drivers receive said number of pixels in parallel over said data lines.

* * * * *